Patented Oct. 24, 1944

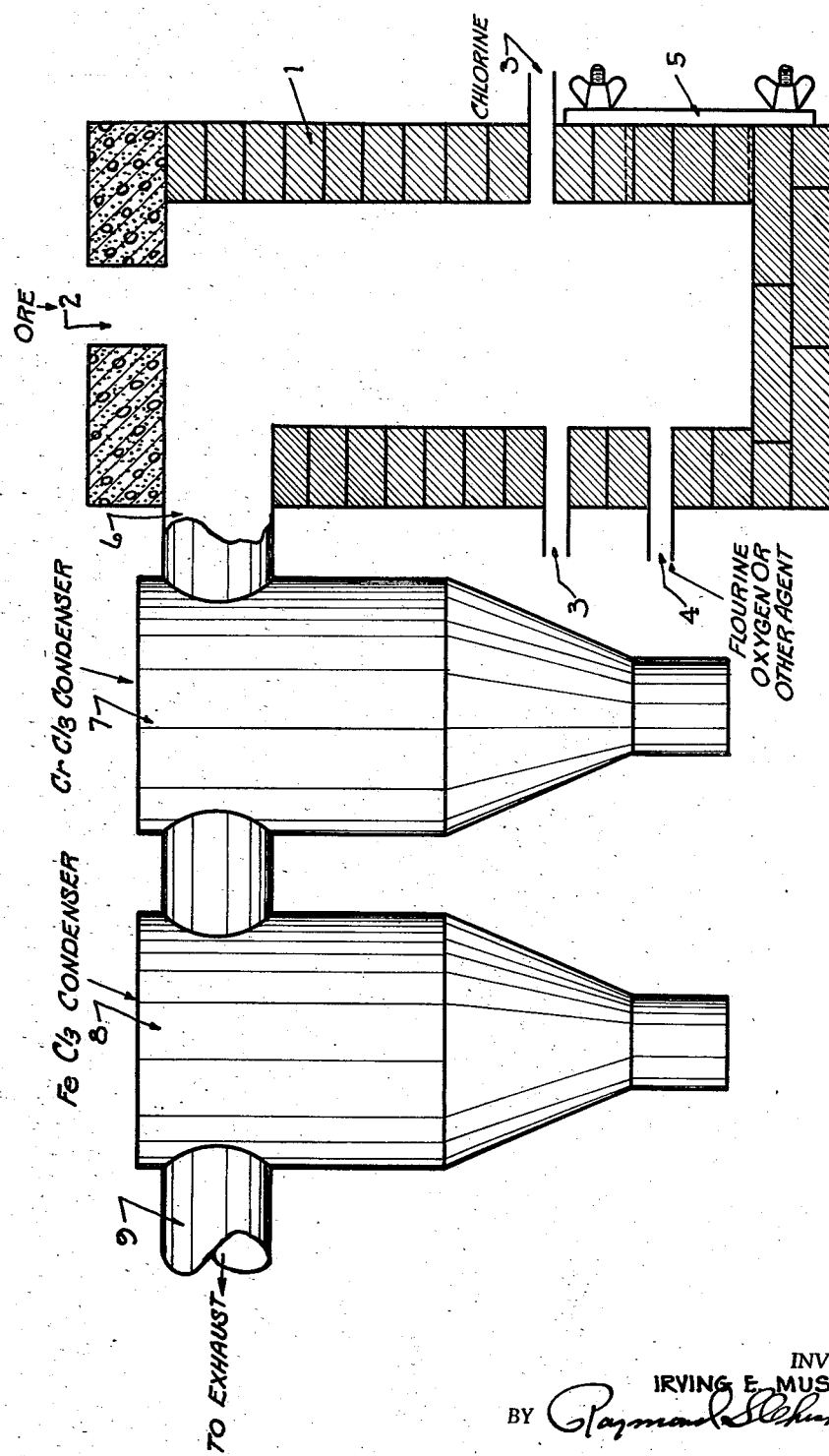

2,361,048

UNITED STATES PATENT OFFICE 2,361,048

CHLORINATION OF CHROMIUM BEARING MATERIALS

Irving E. Muskat, Akron, Ohio, assignor to Pittsburgh Plate Glass Company, Allegheny County, Pa., a corporation of Pennsylvania Application December 22, 1939, Serial No. 310,537

20 Claims. (Cl. 75—112)

This invention relates to the chlorination of chromium containing substances, such as chromium ores, for example, chromite ore, and particularly to the treatment of materials wherein the chromium concentration is substantial, generally in excess of 20 per cent. In the chlorination of such ores, it is often found that the ore in the interior of the chlorinating furnace sinters and bridges to such an extent that continued operation becomes extremely difficult, if not impossible.

I have found that the bridging or plugging is due, in part, at least, to the formation of chlorine compounds which soften or melt at the temperature of treatment, but which do not readily volatilize. These softened chlorides, oxychlorides, or other chlorine compounds, tend to agglomerate the ore and to form a solid sintered mass in the furnace, thus preventing continuous operation. For example, magnesium, which is a common constituent in many chromium ores, is converted to compounds containing magnesium and chlorine which soften or melt with consequent plugging of the furnace. The plugging may be produced or complicated by other additional factors which as yet have not been determined. In accordance with my invention, I have found that by introducing a substance into the furnace which is capable of converting the magnesium chloride into a material having a higher or lower melting point, the tendency toward bridging is substantially eliminated. In addition, the formation of undesirable chlorine containing substances of high boiling point may be substantially minimized and thus, the loss of chlorine through formation of such chlorides is thereby prevented since these materials remain in the residue often in the form of oxides, oxycompounds, fluorides, sulphates, etc. The avoidance of plugging within the furnace may be due to decomposition of the chlorides by agents introduced after such softened or melted chlorides are formed, or to the fact that objectionable chlorine compounds are not formed in the presence of such agents. Regardless of this explanation, however, it is found that compounds capable of converting magnesium chloride into a compound of higher melting point do minimize sintering or plugging and are effective even when some magnesium chloride is formed during the reaction.

Various agents have been found to be suitable for use in accordance with this invention. Thus, oxygen, air, water vapor, ozone, manganese dioxide, peroxides, perchlorates, or similar oxygen compounds capable of reacting with magnesium chloride are found to prevent plugging in sintering concentration. Similarly, other materials which react with magnesium chloride to form compounds of higher melting points such as oxides of sulphur such as sulphur trioxide or sulphur dioxide, oxides of phosphorous such as phosphorous pentoxide, or phosphoryl chloride, oxides of nitrogen such as nitrous oxides or nitrogen peroxide, fluorine, etc., may be introduced for this purpose.

The process may be conducted at a temperature sufficient to insure formation of volatile chromium chloride which may be removed from the furnace and subsequently condensed. In such cases other common constituents of chromium ores, such as iron, may be simultaneously removed with the chromium as mixed chloride vapors and the chromium chloride separated from the remaining chlorides by fractional condensation. If desired, however, the process may be conducted at temperature below that at which chromium chloride vaporizes in which case lower boiling point chlorides, such as ferric chloride may be vaporized and removed while the chromium chloride is produced in the solid state. This chromium chloride may be subsequently vaporized in the presence or absence of further chlorine, if desired.

In general, it is found desirable to chlorinate a mixture of ore and carbon or other suitable reducing agent. The ore may be of any convenient size or form but is preferably finely ground, for example, to minus 100 mesh, and is then mixed with a suitable carbonaceous product, such as coal coke, petroleum coke, charcoal or coal. The mixture may then be treated with chlorine as such or may be preliminarily briquetted prior to chlorination.

The amount of agent capable of minimizing sintering to be introduced is dependent to some degree upon the temperature of treatment and the amount of carbon or carbonaceous material present. In addition, it is governed by the amount of impurities such as magnesium, calcium, barium, strontium, or other metallic agents capable of forming a chloride which softens or melts during chlorination. In general, concentrations of the agent above about 3 percent by volume of the chlorinating gas used has been found to be satisfactory. Concentrations of the agent substantially in excess of this value may be used, but it is preferred that the amount of reagent used should not overwhelmingly exceed the amount of chlorine or similar agent since otherwise the chlorine in the furnace will be so diluted that maintenance of the temperature of reaction may be difficult. Preferably, the amount of chlorine should comprise not substantially less than 20 percent of the total gas introduced into the chlorination chamber. The chlorine and reactive agent may be separately introduced into the furnace or the gases may be mixed beforehand.

The process may be conducted in any convenient apparatus, such as a rotary kiln, a shaft furnace or a roasting oven. These furnaces may be externally heated, if necessary. I have found it convenient to make use of a shaft furnace and, in general, the process may be conducted in a manner such that the heat of the reaction maintains the desired temperature without application of external heat. In order to initiate the process, the furnace may be preheated in a convenient manner and when it has been heated to a desired temperature, for example, about 500° C., an initial charge of ore may be introduced. This charge may consist of a mixture of carbon and briquettes containing carbon and ore. Sufficient chlorine and oxygen, fluorine, phosphorous pentoxide, or other agents are introduced to initiate the chlorination reaction. Further charges of briquettes and carbon or carbonaceous material may be introduced as the reaction proceeds. When the temperature exceeds about 700° C., it is found that the chlorination reaction occurs with such rapidity and with sufficient evolution of heat that the temperature may be maintained without addition of heat from external sources. Where the charge is brought up to temperature partly or entirely by external heating, after such heating is reached, external heating may be discontinued.

In operations involving the use of a shaft furnace or similar device, wherein the ore is introduced at the top of the chlorination zone and unchlorinated residue is withdrawn from the bottom of the zone, it is desirable to introduce the agent to be used to decompose magnesium chloride or similar compound which causes sintering at or near the bottom of the ore bed. In this way the nonvolatile chlorides which tend to accumulate in the lower portion of the bed are decomposed and the evolved chlorine is swept back into the upper portion to chlorinate fresh ore.

The accompanying drawing diagrammatically illustrates a suitable apparatus for conducting the process in accordance with my invention. This apparatus comprises a suitable shaft furnace 1, which may be constructed from firebrick or other resistant material and which is provided with chlorine tuyères 3, and one or more tuyères 4, for introduction of the agent for reaction with magnesium chloride and is connected to a series of condensers 7 and 8. In the ordinary operation of this furnace a charge of coke may be introduced into the furnace, a blast of oxygen introduced through the tuyères 4, and the coke ignited. When the temperature has reached a suitable value, for example, 850° C., a charge of ore and carbon briquettes may be introduced through furnace inlet 2, which is then closed by a suitable cover (not shown). At this time chlorine is introduced into the bed of ore within the furnace and the flow rates of the oxygen or other agent and the chlorine are adjusted in accordance with the amount of ore introduced. Additions of ore may be either continuous or intermittent. The base of the furnace is provided with a suitable door or other closure 5, at which ash and unchlorinated ore may be withdrawn continuously or intermittently. The iron and chromium chlorides which volatilize are withdrawn through outlet pipe 6, and may be led to a heated condenser 7, where chromic chloride is condensed and thence to a cool condenser 8, where iron chloride is separated. The exhaust gases are withdrawn through conduit 9, to a scrubbing tower (not shown) for the purpose of removing suspended solids therefrom.

In order to maintain the process in continuous operation, it is preferred to introduce the ore, carbon, chlorine and fluorine or similar agent at such a rate that the temperature is maintained above 700° C., preferably at 850–1150° C. Ordinarily, this may be done by regulating the rate of introduction of carbon-ore mixtures or briquettes in accordance with periodic or continuous observation of the temperature in the reactor. Thus, if the temperature begins to decrease, the rate of introduction of the chlorine and of the ore-carbon mixture may be increased, while if the temperature increases, the rate of ore, carbon and chlorine or air or similar agent introduction may be decreased. The temperature also may be regulated to some degree by controlling the rate of withdrawal of the chlorinated residue since a large amount of heat may be dissipated by rapid removal of the residue and the reactor cooled by the cool incoming ore.

If difficulty is encountered in maintaining the temperature by the heat of the chlorination reaction, carbon lumps may be added to the reaction zone with or without a charge of briquettes and air or oxygen introduced to burn sufficient carbon to raise the temperature to the desired value. In addition, briquettes containing an increased concentration of carbon may be added. Occasionally, the heat developed during the reaction is so great that the temperature of the reaction zone is too high for practical operation. The reaction may be cooled, if desired, by introduction of a diluent gas such as nitrogen or carbon dioxide. Carbon dioxide appears to be particularly effective as a cooling gas in the reaction. Since substantially uniform results may be secured throughout the range of 850–1150° C., considerable latitude in temperature regulation may be permissible so long as the temperature remains within this range.

The temperature to be maintained is governed by the nature of the process to be conducted. Thus, where it is desired to operate in a manner such that chromium chloride is volatilized, it is found preferable to maintain the temperature not substantially less than 750° C. On the other hand, if it is desired to prevent volatilization of the chromium chloride, and to volatilize such materials as iron chloride, the temperature may be maintained at about 400° C. to 600° C. Operation at the lower temperatures may necessitate the application of heat in order to maintain the reaction temperature.

The carbon concentration in the ore-carbon mixture may be varied in accordance with the amount of oxygen introduced into the furnace if oxygen is used, and upon the composition of the ore. With high concentrations of air, correspondingly high concentrations of carbon are generally desirable, while with lower concentrations of air, the carbon concentrations may be correspondingly low. The carbon concentration is also governed by the amount of chromium and iron in the ore since with high chromium and iron concentrations, the carbon should be correspondingly high and with lower concentrations of these metals, the carbon required is correspondingly low. Carbon in excess of 10 percent of the weight of the ore is generally found desirable. In treating chromium ores such as chromite which contain 35 to 55 percent Cr₂O₃ for vaporization of both iron and chromium chlorides, it is found that optimum results may be obtained by introducing 8 to 25 percent by weight of carbon based upon the weight of the ore and 5 to 20 percent by volume of gaseous reagent based upon the chlorine introduced.

The following example is illustrative:

A quantity of briquettes ¼ to 1 inch in diameter were prepared from a mixture of 100 parts by weight of ore, 12 parts by weight of ground coke, 8 parts by weight of sawdust and 12 parts by weight of molasses, by firing at 500° C. until the binder was substantially carbonized. The carbon content of the briquettes was about 17 percent of the weight of the briquettes. The ore contained 42.6% Cr₂O₃, 22% FeO and 12.1% MgO.

A shaft furnace having an internal diameter of 10 inches was preheated by a coke fire within the shaft at 1000° C. At this time a charge of briquettes was added and chlorine and fluorine were introduced into the base of the shaft to initiate the chlorination reaction. The process was carried on continuously for many hours by introducing briquettes at a rate of 0.22 kg. per minute, chlorine at a rate of 150 liters per minute and fluorine at the rate of 15 liters per minute. The temperature remained at about 1000° C. throughout the reaction and the chloride vapors given off where recovered and condensed to recover chromium and ferric chloride. No tendency toward bridging within the furnace was noted during the run. In a similar run, under the conditions set forth in this example, with the sole exception that no fluorine was introduced, bridging occurred to such an extent that it was necessary to suspend operation only a few minutes after the process was begun.

In many cases it may be desirable to conduct the chlorination in a manner such that chromic or chromous chloride is formed without formation of a substantial amount of iron chloride. It is found that by use of large amounts of oxygen or similar agent during chlorination of chromium bearing materials the formation of iron chloride may be materially reduced.

Although this invention has been described with reference to specific details of certain embodiments thereof, it is not intended that such details shall be regarded as limitations upon the scope of the invention except insofar as included in the accompanying claims. This application is closely related to a copending application filed by myself and Norman Howard, now Patent No. 2,185,218, granted January 2, 1940.

I claim:

1. In the process of producing chromium chloride by chlorinating a chromium bearing material which contains magnesium in such concentrations as to cause sintering during chlorination, the step which comprises minimizing sintering of the ore during chlorination by converting a sufficient portion of the magnesium chloride to a magnesium compound having a substantially higher melting point than the magnesium chloride to substantially minimize sintering of the ore.

2. In the process of producing chromium chloride by chlorinating a chromium bearing material which contains magnesium and which normally sinters during chlorination, the step which comprises minimizing sintering of said material during chlorination by decomposing a sufficient portion of the magnesium chloride formed during the reaction to substantially minimize sintering of the ore undergoing chlorination.

3. In the process of producing chromium chloride by chlorinating a chromium ore which normally sinters during chlorination at a temperature sufficient to volatilize iron chloride, the step which comprises conducting the chlorination of the ore in the presence of sufficient reagent capable of reacting with magnesium chloride to form a magnesium compound of higher melting point than magnesium chloride to substantially minimize sintering within the furnace.

4. In the process of producing chromium chloride by chorinating a chromium ore at a temperature sufficient to volatilize iron chloride, the step which comprises conducting the chlorination of the ore in the presence of sufficient sulphur trioxide to substantially minimize sintering within the furnace.

5. In the process of producing chromium chloride by chlorinating a chromium ore at a temperature sufficient to volatilize iron chloride, the step which comprises conducting the chlorination of the ore in the presence of an oxide of phosphorous in an amount sufficient to substantially minimize sintering within the furnace.

6. A continuous process of chlorinating a chromite ore which normally sinters during chlorination which comprises introducing the ore into an upper portion of a furnace and contacting the ore with chlorine at a temperature sufficiently high to volatilize iron chloride and a chloride of chromium and to form a residue containing unvolatilized material which normally tends to cause sintering within the furnace and introducing an oxide of phosphorous into a lower portion of the furnace in an amount sufficient to decompose the sintering chlorides within the furnace and to substantially minimize sintering within the furnace.

7. A continuous process of chlorinating a chromite ore which comprises introducing the ore into an upper portion of a furnace and contacting the ore with chlorine at a temperature sufficiently high to volatilize iron chloride and a chloride of chromium and to form a residue containing chlorides which normally tend to cause sintering within the furnace and introducing sulphur trioxide into a lower portion of the furnace in an amount sufficient to decompose the sintering chlorides within the furnace and to substantially minimize sintering within the furnace.

8. A continuous process of chlorinating a chromite ore which comprises introducing the ore into an upper portion of a furnace and contacting the ore with chlorine at a temperature sufficiently high to volatilize iron chloride and a chloride of chromium and to form a residue containing chlorides which normally tend to cause sintering within the furnace and introducing fluorine into a lower portion of the furnace in an amount sufficient to decompose the sintering chlorides within the furnace and to substantially minimize sintering within the furnace.

9. A continuous process of chlorinating a chromite ore which normally sinters during chlorination which comprises introducing the ore into an upper portion of a furnace and contacting the ore with chlorine at a temperature sufficiently high to volatilize iron and a chloride of chromium and to form a residue containing chlorides which normally tend to sinter within the furnace and introducing a compound which is capable of reacting with said sintering chlorides to form a compound having a higher melting point than the corresponding chloride into a lower portion of the furnace in an amount sufficient to substantially minimize sintering within the furnace.

10. In the process of producing chromium chloride by chlorinating a chromium ore which normally sinters during chlorination at a temperature sufficient to volatilize iron chloride, the step which comprises conducting the chlorination of the ore in the presence of a compound capable of reacting with metallic chlorides which normally tend to cause sintering within the furnace to form a compound having a higher melting point than the corresponding chloride, in an amount sufficient to substantially minimize sintering.

11. The process of treating chromite ore which comprises treating a mixture of ore and carbon with a chlorinating agent in a suitable chamber at a temperature sufficiently high to volatilize iron chloride and to produce a substantial quantity of a chloride of chromium, and minimizing the formation of chlorine compounds other than those of iron and chromium by introducing a quantity of fluorine into the chlorination chamber during the treatment, maintaining the temperature sufficiently high to volatilize chromium chloride and recovering the chromium chloride.

12. The process of treating chromite ore which comprises treating a mixture of ore and carbon with a chlorinating agent in a suitable chamber at a temperature sufficiently high to volatilize iron chloride and to produce a substantial quantity of a chloride of chromium and minimizing the formation of chlorine compounds other than those of iron and chromium by introducing an oxide of phosphorous into the chlorination chamber during the treating, maintaining the temperature sufficiently high to volatilize chromium chloride and recovering the chromium chloride.

13. The process of treating chromite ore which comprises treating a mixture of ore and carbon with a chlorinating agent in a suitable chamber at a temperature sufficiently high to volatilize iron chloride and to produce a substantial quantity of a chloride of chromium and minimizing the formation of chlorine compounds other than those of iron and chromium by introducing a quantity of an oxide of sulphur into the chlorination chamber during treatment, maintaining the temperature sufficiently high to volatilize chromium chloride and recovering the chromium chloride.

14. The process of treating chromite ore containing magnesium which comprises treating a mixture of ore and carbon with a chlorinating agent in a suitable chamber to produce a substantial quantity of a chloride of chromium and minimizing the formation of compounds containing magnesium and chlorine by introducing a sufficient quantity of a compound capable of reacting with magnesium chloride to form a compound having a higher melting point than the magnesium chloride into the chlorination chamber during the treatment to substantially minimize sintering within the chamber.

15. A continuous process of chlorinating a chromite ore which comprises introducing the ore into an upper portion of a furnace and contacting the ore with chlorine at a temperature sufficiently high to volatilize iron and a chloride of chromium and to form a residue containing chlorides which normally tend to sinter the ore within the furnace, introducing a compound which is capable of reacting with said sintering chlorides to form a compound having a higher melting point than the corresponding chloride into a lower portion of the furnace in an amount sufficient to decompose the sintering chlorides within the furnace and to substantially minimize sintering within the furnace, and introducing ore, chlorine and a carbonaceous reducing agent at such a rate that sufficient heat is evolved from the reaction to maintain the temperature in excess of 850° C. within a portion of the reaction zone without externally heating said zone.

16. In a process of producing chromium chloride by chlorinating a body of chromium bearing ore which contains magnesium in such concentration that substantial sintering of the ore body normally occurs during chlorination of the ore, the step which comprises conducting the chlorination in the presence of a reagent capable of converting magnesium chloride to a magnesium compound having a substantially higher melting point, the said reagent being present in a concentration sufficient to substantially minimize the tendency of the ore to sinter.

17. In a process of chlorinating a chromium ore which normally sinters during chlorination, the step which comprises conducting the chlorination of the ore in the presence of a gaseous agent capable of substantially minimizing sintering within the furnace at a temperature sufficiently high to volatilize chloride of chromium.

18. A method of treating a chromium bearing material which normally sinters during chlorination which comprises forming a pervious bed containing said material, chlorinating said bed at a temperature sufficiently high to form and volatilize a chloride of chromium and introducing into said bed a gaseous agent capable of minimizing sintering within the bed in amount to substantially minimize the sintering which would otherwise normally occur.

19. A method of treating a chromium bearing material which normally sinters during chlorination which comprises forming a pervious bed containing said material, chlorinating said bed at a temperature sufficiently high to form and volatilize a chloride of chromium and introducing into said bed an agent capable of reacting with sintering chlorides to form compounds of higher melting point in amount to substantially minimize the sintering which would otherwise normally occur.

20. The process of claim 19 wherein the chlorination is conducted at a rate such that sufficient heat is evolved from the reaction to maintain the temperature within at least a portion of the bed in excess of 850° C. without externally heating the reactor within which the bed is located.

IRVING E. MUSKAT.